US007334486B1

(12) United States Patent
Klammler et al.

(10) Patent No.: US 7,334,486 B1
(45) Date of Patent: Feb. 26, 2008

(54) DEVICE AND METHOD FOR MEASURING FLUID FLUXES, SOLUTE FLUXES AND FRACTURE PARAMETERS IN FRACTURE FLOW SYSTEMS

(75) Inventors: Harald Rene Klammler, Gutenberg (AT); Kirk Hatfield, Gainesville, FL (US); Michael D. Annable, Gainesville, FL (US); John Anthony Cherry, Waterloo (CA); Beth Louise Parker, Guelph (CA)

(73) Assignee: University of Florida Research Foundation, Inc., Gainesville, FL (US)

( * ) Notice: Subject to any disclaimer, the term of this patent is extended or adjusted under 35 U.S.C. 154(b) by 108 days.

(21) Appl. No.: 11/409,701

(22) Filed: Apr. 24, 2006

(51) Int. Cl.
*G01F 1/704* (2006.01)

(52) U.S. Cl. ............................................... 73/861.07

(58) Field of Classification Search ............... 73/64.56, 73/861.04, 861.07, 861.23
See application file for complete search history.

(56) References Cited

U.S. PATENT DOCUMENTS

| 4,107,525 | A | * | 8/1978 | Hart, Jr. ..................... 250/303 |
| 5,594,179 | A | * | 1/1997 | Marsh ........................ 73/861.07 |
| 5,833,388 | A | * | 11/1998 | Edwards et al. .............. 405/52 |
| 5,942,440 | A | * | 8/1999 | Dooley et al. ............... 436/146 |
| 6,401,547 | B1 | | 6/2002 | Hatfield et al. |
| 2005/0235757 | A1 | * | 10/2005 | De Jonge et al. ......... 73/861.07 |

FOREIGN PATENT DOCUMENTS

DE            20116283 U   *   2/2002

WO        WO 01/33173 A1   *   5/2001

OTHER PUBLICATIONS

SciTechLibrary; Complexing Sorbents Polyorgs; Authors: G.V. Myasoedova and co-authors, published Apr. 26, 2001; www.sciteclibrary.ru/eng/catalog/pages/1560.html (copy enclosed).

(Continued)

*Primary Examiner*—Hezron Williams
*Assistant Examiner*—John Fitzgerald
(74) *Attorney, Agent, or Firm*—McDonnell Boehnen Hulbert & Berghoff LLP

(57) ABSTRACT

An improved method and apparatus for simultaneously monitoring the magnitudes and directions of fluid fluxes and dissolved contaminants fluxes of a general flow system in both simply and multiply screened monitoring wells as well as unscreened boreholes is provided. Also, parameters such as fracture locations, separations, inclinations, orientations of inclination and apertures in a fracture flow system can be estimated. The invention comprises the use of a sorbent layer containing an insoluble sorbent matrix that retains dissolved contaminants, which is attached to an impermeable flexible liner. The matrix may also contain visible or invisible tracers that can be displaced by the fluid flow. The monitoring comprises placing devices in contact with the contaminated flow over certain intervals, thereby allowing contaminants to be sorbed to the sorbing matrix of the layer. Sufficient time is allowed for the contaminant concentrations in the flow field to reach equilibrium. The sorptive layer is then removed from contact with the flow field and analyzed to determine cumulative contaminant fluxes and cumulative fluid fluxes. Dye tracer marks on the sorptive layer allow for identifying fracture locations, separations, inclinations, orientation of inclinations and apertures as well as flow directions in the fracture planes.

8 Claims, 3 Drawing Sheets

OTHER PUBLICATIONS

Flexible Liner Underground Technologies, Ltd. Co.; Comparison With Traditional Practice; Author: Carl Keller, Flexible Liner Underground Technologies; 2002; www.flut.com/compare.htm (copy enclosed).

Flexible Liner Underground Technologies, Ltd. Co.; Methods: Groundwater Sampling; 2002; www.flute.com/meth_2.htm (copy enclosed).

* cited by examiner

- AMBIENT FORMATION
- SORBENT LAYER
- IMPERMEABLE FLEXIBLE LINER

- TRACER ELUTED
- qo
- TRACER REMAINING

TRACER ELUTED qo

TRACER REMAINING

IMPERMEABLE FLEXIBLE LINER IN BOREHOLE

GROUND SURFACE

WATER TABLE

FRACTURE PLANES AND FLOW DIRECTIONS

FLOW THROUGH MATRIX BLOCKS

SORBENT LAYER ON IMPERMEABLE FLEXIBLE LINER

UNFRACTURED BEDROCK

DEVICE AND METHOD FOR MEASURING FLUID FLUXES, SOLUTE FLUXES AND FRACTURE PARAMETERS IN FRACTURE FLOW SYSTEMS

BACKGROUND OF THE INVENTION

1. Field of the Invention

The present invention generally relates to detection of organic and inorganic contaminants as well as natural dissolved constituents, and more particularly to the analysis of water supplies for the measurement and characterization of organic and inorganic contaminants or natural dissolved constituents therein. In particular, this invention relates to devices and methods for measuring cumulative dissolved solute (contaminant) fluxes and cumulative fluid fluxes in flow systems. The term flow systems as used herein includes, but is not limited to, saturated and variably saturated geologic and non-geologic media, such as (1) saturated and unsaturated fracture rock aquifers, where flow occurs both within fracture planes separating different matrix blocks as well as within the more or less permeable matrix blocks themselves, and (2) saturated and unsaturated sedimentary (porous) aquifers, where flow occurs through the intergranular space as well as through possible preferencial flow paths of elevated hydraulic conductivities. It is an essential feature of the invention that is can be applied in both simply or multiply screened observations wells as well as in unscreened boreholes. The present invention also allows for the determination of parameters such as fracture (or preferential flow path) locations, separations, inclinations, orientations of inclination and aperture (width).

2. Description of the Relevant Art

The presence of solutes in ground water supplies and other water resources can present significant pollution problems. A wide variety of organic and inorganic contaminants may be present in subsurface, water-bearing geologic formations, depending on how the overlying land under consideration has been used. For example, many different organic solvents and related compounds (e.g., non-halogenated and halogenated organic compounds) may exist in groundwater supplies beneath factory sites and other locations where extensive use of these chemicals has occurred over long time periods or accidental spills or inappropriate disposal have occurred. Of particular concern are halogenated (e.g., chlorinated) solvents including perchloroethene (PCE), trichloroethene (TCE), dichloroethane (DCA), vinyl chloride (VC), methylene chloride (MC), and others. However, in addition to halogenated solvents, a wide variety of other organic compounds shall be encompassed within the term "organic contaminants" as discussed below. Of equal concern are the presence of benzene, toluene, xylenes, and other constituents of petroleum-based fuels (e.g., jet fuel, gasoline, diesel fuel, and the like) in waste-bearing geologic formations underlying various transportation-related facilities. Examples of such facilities include gasoline stations, airports, military bases, and the like. Other types of contaminants include various pesticides and nutrients used in crop production or suburban lawns and gardens or golf courses as well as trace metals such as arsenic and chromium and the like used in industrial operations. At many sites, both organic and inorganic contaminants may be found as mixtures. A contaminant group designated as polyaromatic hydrocarbons (PAHs), such as naphthalene, phenanthene, anthracene, benzo-a-pyrene and others, are constituents of coal and/or tars and creosote found at former gas manufacturing sites and wood treating facilities. Natural dissolved constituents are typically present to different degrees in the groundwater and originate from the dissolution of naturally occurring elements in a system. They can include, but are not limited to, cations such as sodium, calcium, magnesium; anions such as cloride, sulfate, bicarbonate; or natural dissolved carbon. Knowledge of the presence of natural dissolved constituents can significantly contribute to a better understanding of the condition and behavior of a groundwater resource. Extreme levels of natural dissolved constituents can also lead to pollution problems; hereafter, the term contaminants as introduced above shall also encompass naturally dissolved constituents. Regardless of the particular contaminants of concern, the presence of these chemicals at or near subsurface or surface water supplies is a considerable public health concern and of ecological significance. Accordingly, the present invention shall not be restricted to the monitoring of any given organic or inorganic compounds.

Several methods have been used to analyze water quality. Of particular importance is the analysis of groundwater existing in aquifers for concentrations of organic waste products. The term "aquifer" as used herein describes a large water-bearing geologic formation that is capable of yielding sufficient water to satisfy a particular demand (e.g., drinking water or industrial uses or irrigation needs). Prior testing methods have involved the drilling of wells directly into the aquifer, followed by the placement or not of screening materials within the wells depending on the stability of the borehole wall (e.g., stable rock or loose sediments). For deep aquifers, dedicated submersible pumps are then positioned in each well to withdraw numerous water samples of delivery to the wellhead. For shallow aquifers, bailing the water or pumping from above ground can be used for sampling. Thereafter, the samples are analyzed to determine the type and concentration of organic contaminants in the collected water samples. Measurement of water levels (or pressure) in a network of wells enables estimation of average fluid fluxes, if the hydraulic conductivity of transmitting of the aquifer is known.

While the prior methods provided important information regarding the levels of contamination in the water supplies of concern, they did not allow for the estimation of contaminant fluxes and fluid flow fluxes. There is another technology (Passive Flux Meter) that we have developed which uses a permeable, sorptive unit intercepting water flow and solute transport, and which is capable of measuring both cumulative water and solute fluxes. However, this technology is not designed for applications in fracture flow systems for various reasons: (1) cross connections between fractures may occur disturbing the natural flow regime; (2) difficult installation and removal from unscreened boreholes due to common irregularities and instabilities in fracture rock borehole walls; (3) creation of cavities due to borehole irregularities that the existing technology cannot compensate for; and (4) more difficult or impossible detection of dye tracer marks to determine fracture parameters and flow direction. Also, the Passive Flux Meter technology is not optimal for observation wells with multiple screen intervals (in any type of aquifer), since cross connections between different horizons can distort the measurement. Furthermore, Pan lysimeters (free drainage samplers) and suction lysimeters have both been used to measure cumulative fluid and dissolved solute fluxes in porous media when the direction of flow is vertical; however these technologies are not suitable for applications in fracture rock aquifers neither for measuring horizontal fluxes.

Parameters of a fracture rock flow system (fracture locations, separations, inclinations, orientations of inclinations and fracture apertures), for example, can be determined with existing, well known, geophysical technologies. However, these methods are instrumentally cumbersome and do not provide measurements of water or solute fluxes. Thus, to simultaneously measure magnitudes and directions of cumulative fluid fluxes or cumulative solute fluxes associated with one or more fluids flowing in a fracture flow systems, and to simultaneously determine parameters such as fracture locations, separations, inclinations, orientations of inclinations and fracture apertures, a new method is needed.

Current methods for estimating contaminant mass flux (J) in aquifers are made from independent instantaneous measurements of flux ($q_o$) and solute concentration (C) in the pore or fracture water. Several methods exist for measuring $q_o$ and C in saturated and unsaturated geologic formations. All existing methods are confined to providing estimates characterized over vertical or horizontal sampling lengths. For example, in cases of horizontal saturated flow, $q_o$ and C are estimated over isolated vertical segments of a well, whereas in estimating solute mass and fluid fluxes associated with vertical infiltration or leaching, the pertinent sampling lengths are the horizontal or areal extents of infiltration. Continuous temporal measurements of $q_o$ can be done for saturated flow systems. Methods of measuring vertical unsaturated flow require that the flow be intercepted and then retained for direct volumetric measurement and chemical analysis. Thus, there is a method for estimating vertical cumulative water fluxes.

Solute concentrations (C) are usually measured at discrete moments in time in both saturated and unsaturated flow systems. However, a device exists to intercept vertical unsaturated flow. Chemical analysis of the water intercepted by this device could be used to estimate cumulative dissolved solutes transported as a result of vertical fluid flow. Measured $q_o$ and C are used as shown in the following equation to estimate the instantaneous contaminant flux J.

$$J = q_o C \quad (1)$$

Equation (1) is assumed to characterize contaminant mass flux over specified sampling dimensions (i.e., an isolated vertical segment of a monitoring well) and for a reported sampling time. For geologic media, this approach of characterizing contaminant fluxes is subject to significant experimental and conceptual errors. Consider first, that the specific discharge $q_o$ (the magnitude and the direction) and solute concentration C are both functions of position and time. This suggests that the magnitude and the direction of mass flux J also vary with position and time. Thus, any sampling of $q_o$ and C over an isolated vertical or horizontal length precludes accurate local estimation of the magnitude and the direction of both fluid and contaminant fluxes. Second, the short-term sampling procedures often used to obtain C and $q_o$ preclude estimation of the time-integrated (i.e., cumulative) values for fluid and contaminant fluxes. Such time-integrated contaminant fluxes are useful for assessing health risks associated with groundwater contamination, for assessing the direction and mass flow of contamination leaving a compliance boundary, for assessing the total amount of off-site contamination contributed by one or more sources, and for assessing the benefits of removing or remediating sources of subsurface contamination. Finally, because the above equation uses spatially averaged values of $q_o$ and C it does not produce valid estimates of contaminant fluxes in typically heterogeneous aquifers or vadose zone flow systems. Accurate estimates of length averaged contaminant fluxes are obtained only from the direct spatial integration of measured local contaminant fluxes J. Thus, existing methods for measuring $q_o$ and C do not provide an adequate discrete or time integrated estimate of contaminant fluxes in saturated or variably saturated geologic formations with the exception of the Passive Flux Meter technology, which is capable of doing so, but yet, is not suited for applications in unscreened fracture rock observation boreholes and suboptimal for multiply screened monitoring wells.

Traditional testing methods for fracture rock borehole inspection also require a large amount of expensive equipment, are labor intensive, and involve complex operating procedures. Moreover, conventional monitoring techniques, which require the removal of numerous fluid samples for individual testing, typically generate large quantities of waste products (e.g., residual sample materials) that, if sufficiently contaminated, can present significant disposal problems. Prior to development of the present invention, a need therefore remained for an efficient testing system circumventing these disadvantages and enabling water supplies in aquifers to be tested in an accurate, rapid, and effective manner.

The claimed invention represents a unique and highly efficient alternative to the methods listed above, which claims to be applicable in both simply and multiply screened monitoring wells as well as unscreened observation boreholes. It does not require extensive equipment (e.g., submersible pumps) or complex operating procedures. The invented device can be used to analyze large water supplies without extracting any contaminated liquid sample materials so that problems with disposal of generated waste fluids are avoided. The invented device can be used to obtain continuous estimates of the magnitude and direction of both fluid and dissolved solute fluxes over one or more specified sampling intervals of different lengths including both flow in a number of fracture planes (or other types of preferential flow paths) and matrix flow inside a block (or flow through porous media in general) within a sampling interval. Sampling intervals can be defined by the lengths of screened intervals in a well casing or by arbitrary decision in the case of a continuous monitoring in an unscreened borehole. In the latter case, the device is furthermore capable of simultaneously indicating fracture plane locations, separations, inclinations, orientations of inclination and fracture apertures. Finally, the method and apparatus described below enable the water supply of interest to be simultaneously analyzed at multiple locations so that the contamination may be "mapped" enabling spatial delineation of the areas of concern. Decontamination of the water source can then occur in a more site-specific and accurate manner. The present invention therefore involves a highly effective testing system, which represents a substantial advance in the art of contaminant detection and remediation as discussed further below.

SUMMARY OF INVENTION

It is an object of the present invention to provide a highly efficient testing method and apparatus, which enables the quantitative and qualitative analysis of contaminants in a flow system.

It is another object of the inventions to provide a method and a device for providing this informations using simply or multiply screened observation wells as well as unscreened observation boreholes.

It is another object of the invention to provide a method and a device for capturing a representative concentration of contaminants in a flow system, which allows for the analysis of a wide variety of different organic and inorganic materials at varying concentration levels.

It is another object of the invention to provide a method and apparatus for monitoring contaminants in a flow system, which uses an operating system and procedure of minimal complexity.

It is another object of the invention to provide a method and apparatus for monitoring contaminants in a flow system, which avoids the need for pump systems.

It is a further object of the invention to provide a method and apparatus for monitoring contaminants in a flow system, which enables testing to take place without physically removing any water samples from the test area.

It is an even further object of the invention to provide a method and apparatus for monitoring contaminants in water supplies, which avoids the generation of waste products (e.g., residual sample materials) and likewise eliminates the disposal problems associated therewith.

Another object of the invention is to provide a method and apparatus for monitoring contaminants in a flow system, which is characterized by reduced labor requirements and processing times.

It is a still further object of the invention to provide a method and apparatus for monitoring contaminants in water supplies, which enables a spatial distribution (e.g., a vertical or horizontal analysis) of the contaminants to be obtained.

It is a still further object of the invention to provide method and apparatus to detect fracture locations, separations, inclinations, orientations of inclination and fracture apertures in a fracture flow system.

It is a still further object of the invention to provide a method and apparatus to be applicable in vertical, horizontal, inclined and curved boreholes.

It is a still further object of the invention to provide a method and apparatus for monitoring fluids and contaminants and their associated local fluxes in water supplies which facilitates the mapping of contamination zones in a highly effective manner so that site specific, high efficiency remediation procedures may be initiated.

It is still a further object of the invention to provide simultaneous measurements of fluid and solute mass fluxes as well as fracture parameters.

It is a still a further object of the invention to provide a method and apparatus for monitoring fluids and contaminants and their associated local fluxes in water supplies to facilitate an assessment of the direction and mass flow of contamination leaving a compliance boundary.

It is a still further object of the invention to provide a method and apparatus for monitoring fluids and contaminants and their associated local fluxes in water supplies to facilitate an assessment of the total amount of off-site contamination contributed by one or more sources.

Another object of the invention is to provide a device and method for measuring the following at specific locations in a fluid flow system: (1) directions and magnitudes of local cumulative fluxes of multiple fluid flows and (2) directions and magnitudes of local cumulative solute mass fluxes associated with these fluid flows.

Finally, another object of the invention is to provide a device and method of measuring the following at specific locations in a flow system: (1) directions and magnitudes of local cumulative water fluxes and (2) directions and magnitudes of local cumulative solute mass fluxes for solutes associated with the fluid flow.

Our invention achieves these objects by providing a method of estimating simultaneously the magnitude and direction of cumulative and time-average fluid flux and dissolved solute mass flux as well as (for fracture flow systems) fracture locations, separations, inclinations, orientations of inclination and apertures. The respective requirements are (a) providing at least one sampling device comprising at least one sorbent layer attached to an impermeable flexible liner ("IFL"), wherein each sorbent layer contains at least one insoluble sorbent matrix and at least one resident tracer with a known mass sorbed on the sorbent; (b) locating a flow system having matrix, fracture or mixed fluid flux containing contaminants; (c) introducing the sampling device into the flow system; (d) allowing the fluid flux to contact the sorbent layer; (e) recording the time that the sorbent layer is in contact with the fluid flux; (f) removing the sampling device from the flow system; (g) removing the sorbent layer from the IFL for visual and laboratory analysis; and (h) analyzing the sorbent layer to quantify the cumulative fluid flux from the mass of resident tracer remaining on the sorbent layer, to identify contaminants and to determine contaminant concentrations and fluxes, as well as fracture parameters from visual inspection of the resident tracer.

Additionally, our invention involves a system for estimating simultaneously the magnitude and direction of fluid flux and dissolved solute mass flux in a flow system, as well as fracture parameters, including locations, separations, inclinations, orientations of inclination and apertures within a fracture flow system, comprising, in combination, (a) at least one monitoring location in a flow system and located in the path of a fluid containing contaminants; (b) at least one sampling device comprising at least one sorbent layer attached to an impermeable flexible liner ("IFL"), wherein the sorbent layer contains at least one insoluble sorbent matrix and at least one resident tracer with a known mass sorbed on the sorbent and removeably positioned in the monitoring location in contact with the fluid flux, such that the contaminants are allowed to contact the matrix for a defined time period; and (c) an analytical procedure comprising methods and instruments to analyze the sorbent layer after removal of the sampling device from the monitoring location and contact with the fluid contaminants, and after removal from the IFL, to measure and quantify cumulative fluid flux and contaminant identification, concentration and cumulative flux as well as fracture parameters.

In accordance with the foregoing, the invention involves both a system and a method that uses an impermeable flexible liner ("IFL"). One such IFL that is commercially available from Flexible Liner Underground Technologies is sold under the brand name FLUTe™. The IFL is made of a fluid impermeable flexible material typically available in a tube or sock design that can easily be fitted into a borehole or equivalent aperture in a formation. Once it is inserted it can then be inflated, like a balloon, with a fluid to cause it to conform to the shape of the borehole. Our invention involves constructing a sampling device where a thin layer of a sorbent layer is attached, preferably removably, to the outside surface of an IFL. Such a configuration allows the sorbent layer to be pressed against the well screen or borehole wall when the sampling device is inserted and inflated. The sorptive layer intercepts portions of both fracture and matrix flows in order to simultaneously measure local cumulative solute fluxes and fluid fluxes as well as the above specified fracture parameters when placed within an unscreened borehole. Because the IFL itself is impermeable, the fluid does not pass into the borehole, but instead is diverted around the IFL. As used herein, "fluid flow" can be, but is not limited to, groundwater or other fluids flowing in a system such as a geologic formation (e.g., fracture rock, sedimentary formation). Typically, fluids within flow systems contain dissolved constituents, including organic and/or inorganic contaminants of concern.

An exemplary configuration of the present invention is, thus, a combination and extension of IFL technology and our previously developed Passive Flux Meter technology. Besides other applications IFL technology has previously been used to qualitatively detect undissolved NAPL phases in the subsurface by deploying a reactive layer on its outside for a visual indication of contact with a target NAPL. Furthermore, IFL technology has been applied in combination with an adsorbent layer, similar to the case of the present invention, with the purpose of adsorbing pore or fracture water through capillary suction, thus allowing for a subsequent quantitative analysis of dissolved constituents. However, this approach is at best quantitative with regard to solute concentrations and does not deliver information about water or solute mass fluxes.

The present invention has two versions that accomplish the same goal; however each version offers different advantages depending on the particular conditions in the hole. Both versions make use of an impermeable flexible liner (IFL) with attached sorbing material. The first version is a continuous IFL and the second version is a segmented IFL. Or, in other words, the first version is a continuous IFL and the second version is, conceptually, a packer. Another way to perceive the second version is that it is a flexible sorbing tube ("FST").

Two methods are available for installing the IFL flux measurement device at a monitoring location (i.e. in an open rock borehole or screened monitoring well). The first, which pertains to the continuous IFL, is the eversion method commonly used to insert FLUTe devices down holes and, in the second method that is used for the segmented IFL, the device is directly lowered without eversion down the hole to the desired position. The fact that the invention can be inserted into holes using either of these two methods is an important feature of the invention because it provides great flexibility/versatility in the use of the device. The invention can be used in holes of any diameter and it can be used at any depth from shallow to deep (i.e. from a few meters to hundreds of meters or deeper). In the direct insertion method, the IFL segment, with its attached exterior cover of sorbing matrix material (i.e. a flexible sorbing tube=FST), or a string of these FST's is inflated with fluid pressure to press the sorbing material against the hole wall. In the eversion method, the sorbing material is not exposed to the borehole water and it does not rub on the wall because the sorbing material is carried down the hole on the inside of the IFL tube, which is closed at the bottom. Mechanisms exist that can protect the sorbing material from abrasion against the wall or pre-mature activation of the sorbing material. In the direct insertion method, the FST is lowered below the free-standing water level with aid of a weight attached to the bottom of the FST. A line (rope, cable or chain) attached to the top of the FST extends to surface where it can be contained on a reel. A thin tube (hose) also extends from the top of the FST to surface. This thin tube is used to inflate the FST by fluid pressure against the wall and it is also used to deflate it when it is desired to remove the FST.

In the direct insertion method, various types of precautions can be taken to prevent the FST from rubbing on the wall when it is lowered down the hole and when it is removed from the hole. One approach for protecting the FST during its descent down the hole involves containing it in a length of pipe (stiff tubing that provides a protective sleeve) until it arrives just above the depth where the flux measurements are to be made. Then the pipe is held at this depth and the flexible sorbing tube is lowered out the bottom to be inflated against the wall. This version of the invention can be designed with one or several flux measurement devices on a string for simultaneous use. Or, the pipe containing the FST can be lowered to the measurement depth interval in the hole and then the pipe can be pulled up, after which the FST is inflated. When a protective pipe is used, it is lowered and raised in the hole using a cable or rope separate from that attached to the top of the FST. After the flux measurement period, the flexible sorbing tube is deflated by applying a vacuum and the FST is then pulled up into the protective pipe that is then raised to surface. This protective inflexible sleeve is just one example of providing protection to the flexible sorbing tube as it goes down and is later withdrawn from the hole. Other methods are available. For example, if the need is only for protection against abrasion, the FSTs can be attached to centralizing devices that keep the sorbing material away from the borehole wall.

When the eversion method is used, the sorbent material can be attached to a long length of IFL so that most or the entire length of the hole is subjected to the flux measurements. However, in some situations this method maybe too time consuming or it may force excessive amounts of contaminated water out of the hole into permeable zones in the formation. In the direct insertion method, this expulsion of water out of the hole into the formation can be avoided or reduced and the time needed for insertion and withdrawal of the flux measurement device can be short. In the direct insertion method, the length of the FST is typically much shorter than the total length of the hole, but nevertheless could have substantial total length in segments so as to simultaneously measure the fluxes associated with many fractures or other types of flow migration pathways.

In the direct insertion method, the sorbtive material is attached to the outside of a segment of IFL. The IFL is a slightly elastic cylindrical tube with a diameter, when inflated, that has the diameter of the hole or nearly so, so that the sorbing material presses tightly against the wall. The IFL tube can be tapered at its top and bottom to prevent bulging or bursting at top or bottom, to maintain lateral pressure of the sorbing material against the wall. In the tapered segments, the sorbing material is not attached. In addition to prevention of bulging this tapering makes the flux measuring device easier to lower out of a protective pipe (sleeve) and later to pull it back into a protective pipe (sleeve) for withdrawal from the hole with no substantial effect on the flux measurement.

In another approach for lowering the flexible sorbing tube (FST) down the hole, the FST is contained inside an outer flexible impermeable sleeve of protective material. This sleeve or shroud consists of thin flexible impermeable material that is closed at top and bottom to prevent exposure of the FST to any contaminants while being lowered to the measurement depth. Once at the measurement depth this protective sleeve is detached (ripped) from the FST using a pull line or other means. After the desired measurement period of the FST in the hole, it is raised quickly to the surface allowing insufficient time for disturbance of the measurement results in the FST.

The essential element that exists in all versions of the invention is the flexible impermeable liner with its cover of sorbing material. This sorbing cover can consist of permeable material or impervious (very low permeability) material. If the material is permeable so as to allow vertical flow of groundwater along it (i.e. if it acts to cause short circuiting along the borehole wall) this could interfere with the flux measurements. Therefore, to prevent such short circuiting, strips of impervious material can be positioned around the FST to segment the FST. These impermeable strips may simply be blank intervals in the FST (i.e. short intervals where the sorbing material is absent).

The IFL, hence, represents an impermeable cylinder in a flow system that diverts flow around it, both inside a fracture plane or preferential flow path and within the matrix. The diverged flow partially passes through and/or by the thin layer of sorbent between the impermeable cylinder and the borehole wall. The sorbent layer on the IFL contains at least one matrix of hydrophobic and hydrophilic insoluble sorbents that are capable of retaining dissolved organic and/or inorganic solutes present in fluid intercepted by the layer. The sorbing matrix can also be impregnated with known amounts of fluid-soluble tracers, which are used to estimate total fluid flux. The selection of sorbent matrices to be used with the device could be, but need not be limited to different geotextiles or other types of fibers such as POLYORGS. The sorbent matrix or matrices that are provided in the sorbent layer could have the inherent capacity to selectively sorb contaminants from the fluid flow.

DETAILED DESCRIPTION

The sampling device of this invention possesses a layer containing at least one insoluble matrix of various hydrophobic and hydrophilic sorbents that have the property to selectively adsorb or absorb organic and inorganic solutes (contaminants) present in a fluid flowing through or by the sorbent layer of the device.

As used herein, "saturated flow" shall mean the flow of the mobile fluid of interest through a flow system with the total interconnected porosity or void volume of solid matrix filled with that fluid.

Likewise, "unsaturated flow" shall mean the flow of the mobile fluid of interest through a flow system in which a fraction of the total interconnected porosity of void volume of the solid media is filled with that fluid and the remaining fraction with another fluid or gas.

And finally, "variable saturated flow" describes the flow of the mobile fluid of interest through a flow system as varying in space and time from the extremes of saturated to unsaturated flow.

Figure 1:
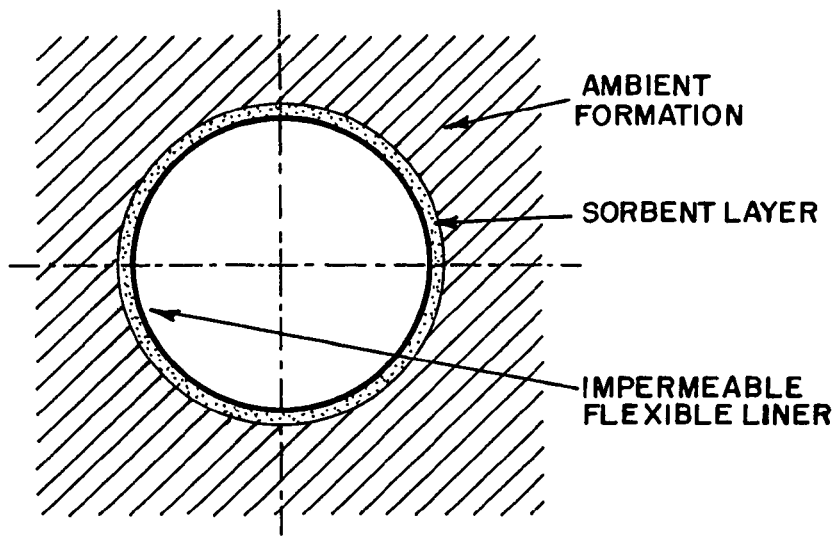
FIG. 1 shows a cross-section of a device installed in a borehole identifying a IFL and an attached sorbent layer.

As shown in FIG. 1, the sorbent layer, which contains at least one uniformly distributed sorbed resident tracer (as indicated by the gray shaded areas in FIGS. 2a and 3a) and at least one insoluble sorbent matrix, is pressed against the borehole or well screen wall by an IFL. The permeable sorbent layer may by glued, sewed or somehow else attached to the IFL as to enable a secure installation and extraction into and from the borehole as well as an easy extraction of tracers and solutes from the sorbent layer after the measurement and to allow for an easy visual inspection of dye tracer marks on the layer. As stated, the insoluble matrix can take the form of geotextiles or other fibers, such as POLYORGS, for example. POLYORGS present the advantage of selectively sorbing certain solutes and allowing for a possible tracer and solute extraction by decomposition of the material itself. The device is designed to take advantage of the IFL methodology for an easy introduction and removal into and from a flow field (e.g., using a borehole). The sorbent material must be insoluble when placed in the flow of the fluids of interest, and preferably is comprised of both adsorbents and ion exchange media. Adsorbents can be selected from aluminas, silicates, aluminosilicates (including molecular sieves), silica gel, magnesium or calcium silicate, clays, carbons and organic polymers. If the matrix comprises ion exchange media, it can comprise cation and anion exchangers, gel resins, phenolic resins, sulfonated phenolic resins, polymer cellulose composites and zeolites.

The accumulation of solutes on the insoluble sorbent matrix over a period of time represents the cumulative mass $M_s$ retained by the permeable unit. The solute mass flux is obtained as follows:

$$J = \frac{q_0 M_S}{V_p R_{d,sol}(1 - M_{R,sol})} \qquad (2)$$

where $V_p$ is the pore volume of an analyzed length interval of the sorbent layer, $R_{d,sol}$ is the retardation factor of a solute in the sorbent layer, $(1-M_{R,sol})$ is the portion of sorbent material occupied by a solvent and $q_0$ is the fluid flux. As shown below, $M_{R,sol}$ is determined as a function of the measurement period $t_d$ and $R_{d,sol}$ while $q_0$ is determined from relative remaining tracer masses in the sorbent ring after $t_d$ and the respective tracer retardation coefficients. Both J and $q_0$ are fluxes with respect to the analyzed length interval of the device, which does not necessarily have to coincide with a particular fracture location and aperture. If the number of fractures and their apertures within a sampling interval of the device are known or determined from dye tracer marks on the sorbent layer, then the actual fluxes J and $q_0$ in the fractures can be estimated. However, the products of flux times sampling interval will always remain constant, i.e., the depth integrated fluxes can be determined independent of fracture frequencies and apertures or the contribution of matrix flow, demonstrating the applicability of the concept to non-fracture flow systems. This assumes that both tracer elution and solute sorption can be regarded as linear with respect to the volume of fluid conveyed through the sorbent layer.

The solute mass retained on the sorbent matrix contained in the unit can be used to estimate cumulative and time-average solute fluxes in a fracture or, more general, over a sampling interval comprising combined fracture and matrix flow or simply matrix flow, which is representative of the volume of fluid interrogated by the sorbent layer. For example, a device designed to sample the entire vertical depth of an aquifer could be used to characterize horizontal solute or groundwater contaminant fluxes continuously over the vertical extent of an aquifer. As described below, the horizontal magnitudes and directions of fluid flow into the permeable unit can be obtained as well as certain fracture parameters.

Figure 2A:
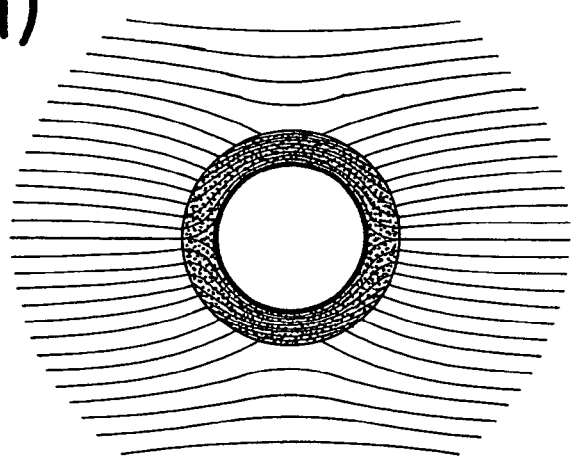
FIG. 2 shows the stream lines through a permeable sorbent layer in the case of a perpendicular intersection between device and flow plane. The gray shaded area represents the tracer distribution before (a) and after (b) exposure to flow.
Figure 2B:
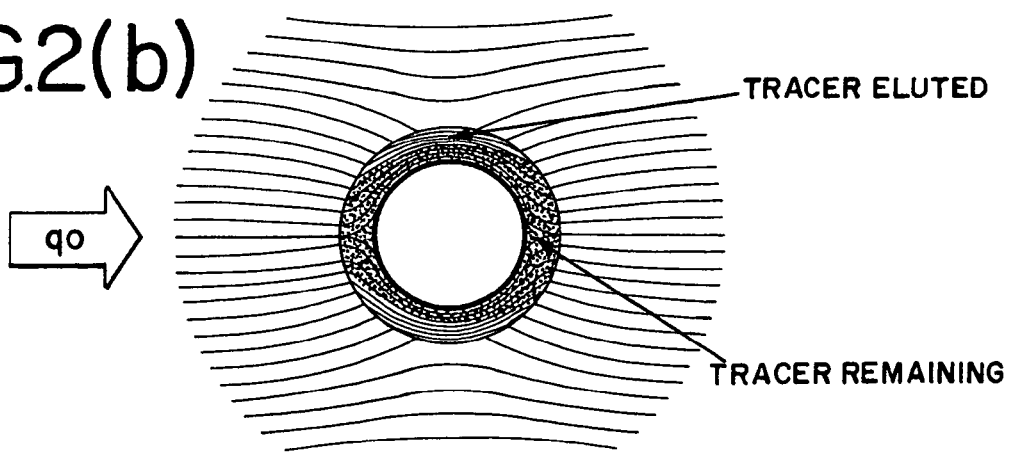
Figure 3A:
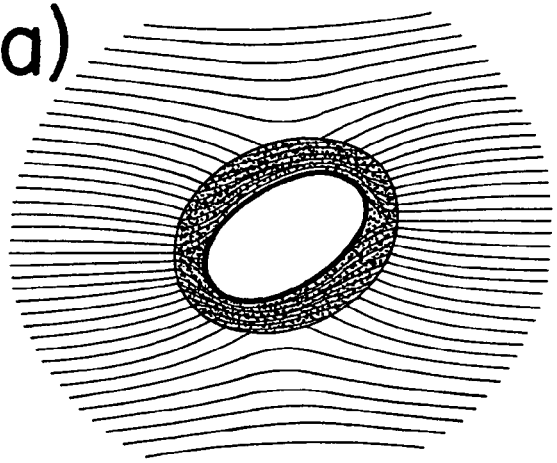
FIG. 3 shows the stream lines through a permeable sorbent layer in the case of a non-perpendicular intersection between device and flow plane. The gray shaded area represents the tracer distribution before (a) and after (b) exposure to flow.
Figure 3B:
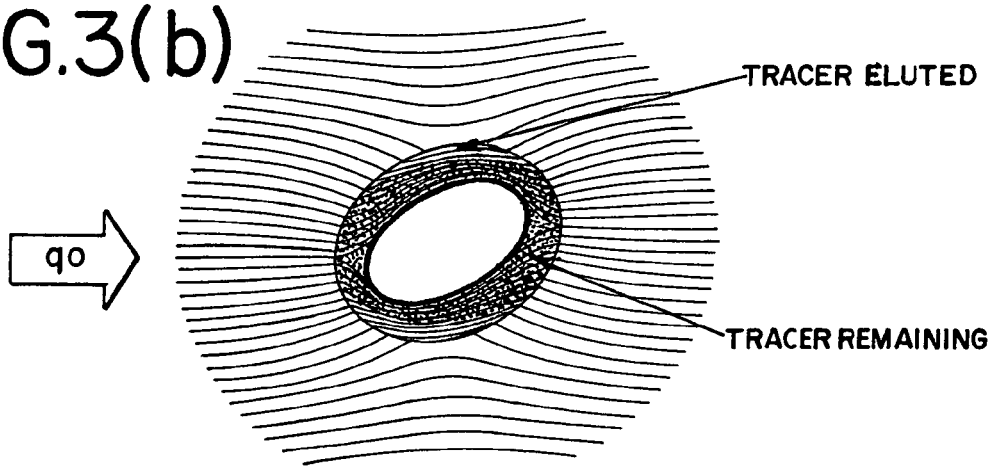

As mentioned, the insoluble sorbent matrix attached to the IFL also is impregnated with known amounts of one or more resident fluid-soluble tracers. Preferably these resident tracers comprise organic and inorganic compounds with a range of partitioning characteristics. Examples of hydrophobic species, which might be used as tracers, include branched and straight-chain aliphatic hydrocarbons, aliphatic alcohols, aromatics and poly-aromatic hydrocarbons (PAHs), and non-ionic surfactants. Anionic tracers can include benzoates, benzenesulfonates, phenates, aliphatic carboxylic acids, and inorganics such as halides, nitrates, nitrites, sulfates, sulfites, phosphates, and metal oxides. Cationic tracers can include ammonium, organic amines, heterocyclic compounds, and inorganic metal ions. The tracers are selected based on the expected or known contaminants to be monitored and measured. For example, if perchloroethylene were known to be a contaminant, then a tracer selected from the group consisting of methyl-substituted alcohols such as methanol, 2-methyl-2-pentanol and 4,2-dimethyl-3 pentanol, would be used. Likewise, if chromate is known to be a contaminant, then a tracer selected from the group consisting of inorganic or organic anionic tracers is used. Alternatively, if nitrate is known to be a contaminant, bromide might be elected as a tracer used on an anion exchange resin media. Other possible tracers known to those in the art can be used. All of these tracers can be used to estimate total fluid flux, while only dye tracers can be used to infer the primary directions of flow as well as the inclinations, orientations, separations and apertures of fracture planes. As fluid, such as water containing contaminants, flows through the sorbent layer, advective transport will cause the soluble tracers to be leached from the sorbing matrix and to be lost from the permeable unit. FIGS. 2 and 3 display the flow fields of two hypothetical cross sections of a device configured as a permeable ring around an IFL. While FIG. 2 depicts the particular case of a perpendicular intersection between the fracture plane and the device, FIG. 3 illustrates the more general case of a non-perpendicular intersection with an arbitrary orientation of the flow in the fracture. In both figures is can be observed how a uniformly distributed tracer (gray shaded areas) in FIGS. 2a and 3a in the sorbent layer is partially eluted during the time of exposure to flow (FIGS. 2b and 3b). For illustrative purposes the thickness of the sorbent rings in the figures was chosen to be greater than generally required. FIGS. 2 and 3 show how tracer elution advances in the sorbent ring and where along the circumference (dye) tracers will be eluted faster or slower. For practical purposes, the locations where the dies will fade first can be considered tangential to the prevailing flow direction. From a visual inspection of the direction of the line shaped marks in the dye, the fracture inclination and orientation can be inferred. The thickness of the leached out lines from the dye indicate a fracture width or aperture. From a quantitative analysis of the remaining tracer masses in the sorbent layer after exposure to a fracture flow the cumulative or time-average fluid flux is determined as described further below.

One significant potential application of the device will be the measurement of cumulative contaminant fluxes in fracture rock aquifers. In this application a device equipped with an insoluble sorbing layer having one or more tracers impregnated thereon is lowered into a monitoring well or borehole located in an aquifer. Solutes from groundwater flowing through the well are retained on the sorbing matrix under natural and induced hydraulic gradients. The device is allowed to remain at a desired location within the aquifer for a fixed period of time, and then removed for visual and laboratory analysis of adsorbed contaminants and the above described tracers to permit characterization (magnitude and direction) of cumulative water flux and cumulative contaminant flux as well as fracture locations, inclinations, orientations, separations and apertures.

Figure 4:
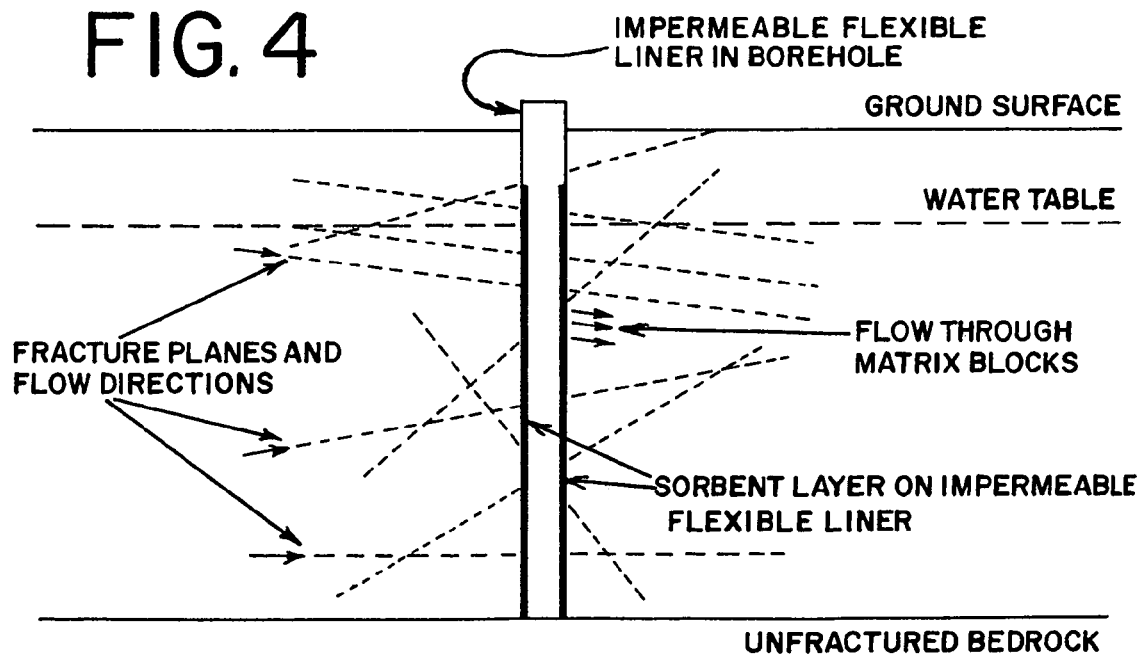
FIG. 4 is a vertical cross-section view of an unscreened borehole containing an example of the continuous IFL configuration intersecting various fracture planes.

As a result of having groundwater flowing through the sorbent layer over time, cumulative flows and the cumulative solute fluxes can be measured in a fracture plane or over a given interval of the observation borehole. For a unit designed to interrogate the entire vertical depth of an aquifer (continuous IFL) the vertical distributions of tracer mass remaining in the device at various depths would yield a vertical characterization of the cumulative fluid flow distribution in the fractures and matrix blocks interrogated. In addition, this device would provide a vertical distribution of contaminant fluxes. FIG. 4 illustrates a device intercepting fracture and matrix fluid flow over a given depth. The device is placed in a monitoring location, in any orientation (i.e., vertical, horizontal, inclined, curved, etc.) depending on the flow system being monitored provided that the unit is placed in the flow system and subjected to fluid flux for a specific time period and then removed from the monitoring location. The sorbent layer is then removed from the unit for analysis. The analysis involves visual inspection of the dye tracer marks, segmenting the sorbent layer, extracting the retained contaminants and remaining tracer(s), performing analysis of extracted materials and calculation of cumulative or time-averaged fluid and solute fluxes. An analysis of the sorbent matrix quantifies vertical variations in the groundwater and contaminant fluxes between different fractures or between selected depth intervals containing an arbitrary number of fractures and matrix flow portions.

Figure 5:
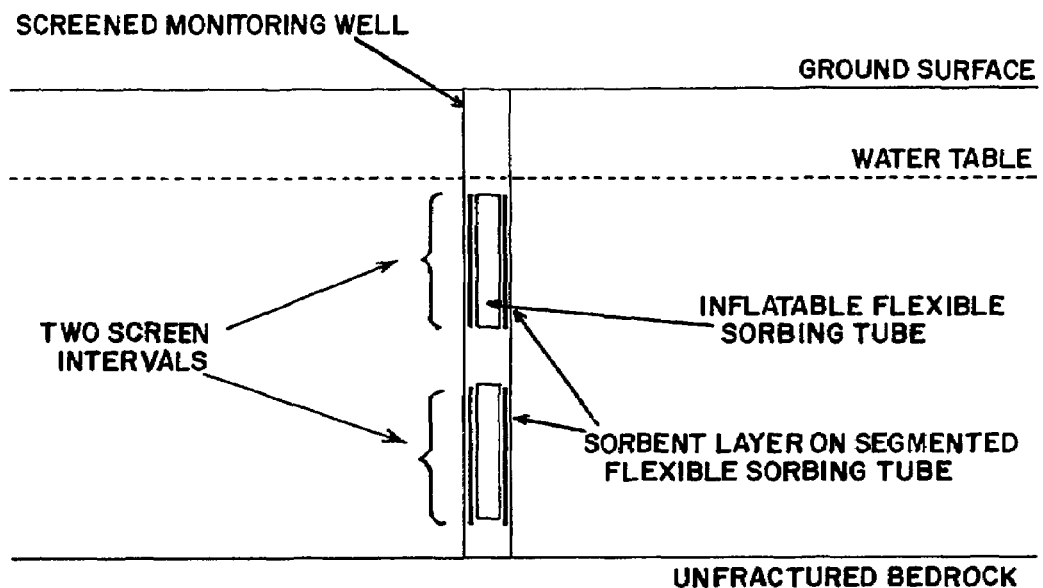
FIG. 5 is a vertical cross-section view of a monitoring well with multiple screen intervals containing an example of the FST or segmented IFL configuration.

FIG. 5 shows an analogous situation where an FST or segmented IFL is used in a monitoring well with multiple screened intervals rather than a continuous IFL in an unscreened borehole.

By installing several devices along a control plane situated perpendicular to the general groundwater flow direction (and this flow could be vertical or horizontal), it is possible to obtain local estimates of the cumulative contaminant mass flux across a control plane. In the case of saturated flow systems where the groundwater flow is generally horizontal, vertical characterization (cumulative and time-averaged magnitude and direction) of this flow and contaminant fluxes is possible by either installing a device with sorbent layers attached at specific depths intervals or by using a continuous sorbent layer that can be segmented vertically for analysis.

One of the simplest sorbent layer configurations is the one of a very thin permeable circular ring around an IFL. At a minimum, this layer would contain at least one insoluble sorbing matrix and have at least one tracer absorbed thereon which before installation, is uniformly distributed over the sorbing matrix as shown in FIGS. 2a and 3a. Exposing the device to flowing groundwater for duration $t_d$ gradually leaches the tracer from the matrix and the unit and produces a residual distribution of tracer as shown in FIGS. 2b and 3b. For a very thin sorbent layer on the IFL and for the case of a perpendicular intersection (FIG. 2) the dimensionless relative mass $M_R$, defined as the fraction of mass remaining of tracer with respect to initial mass of tracer, within the circular cross-section of the matrix is given by the following equation:

$$M_R(\xi) = 2 - \frac{4}{\pi}\arctan(e^{2\xi}) \tag{3}$$

$$\xi = \frac{qt_d}{2r_1 \Theta R_d} \tag{4}$$

$$R_d = 1 + \frac{\rho K_d}{\Theta} \tag{5}$$

Here $r_1$ is the outside radius of the sorbing ring; $\Theta$ is the fluid content of the sorbing ring, $t_d$ is the sampling duration or the time used to measure fluxes with the permeable unit; $\xi$ is a measure of the dimensionless cumulative volume of fluid conveyed through the unit; $R_d$ is the tracer retardation factor for the sorbent(s) used in the unit; $\rho$ is the bulk density of the sorbent; $K_d$ is the tracer sorbent/water partition coefficient; and q is a fictitious fluid flux related to $q_0$ as shown below. Equation (3) is valid for all sampling durations and it can be shown to be an excellent approximation for sorbent ring thicknesses of up to approximately 10% of the borehole radius. For thicker sorbent layers and/or non-perpendicular intersections of device and fracture plane, equation (3) can be represented graphically as a result from a numerical integration procedure as, for example, depicted in FIG. 6. $M_{R,sol}$ for equation (2) is obtained from equation (3) by applying $\xi$ that is determined by using the retardation factor $R_{d,sol}$ of the solute rather than for a tracer.

Figure 6:
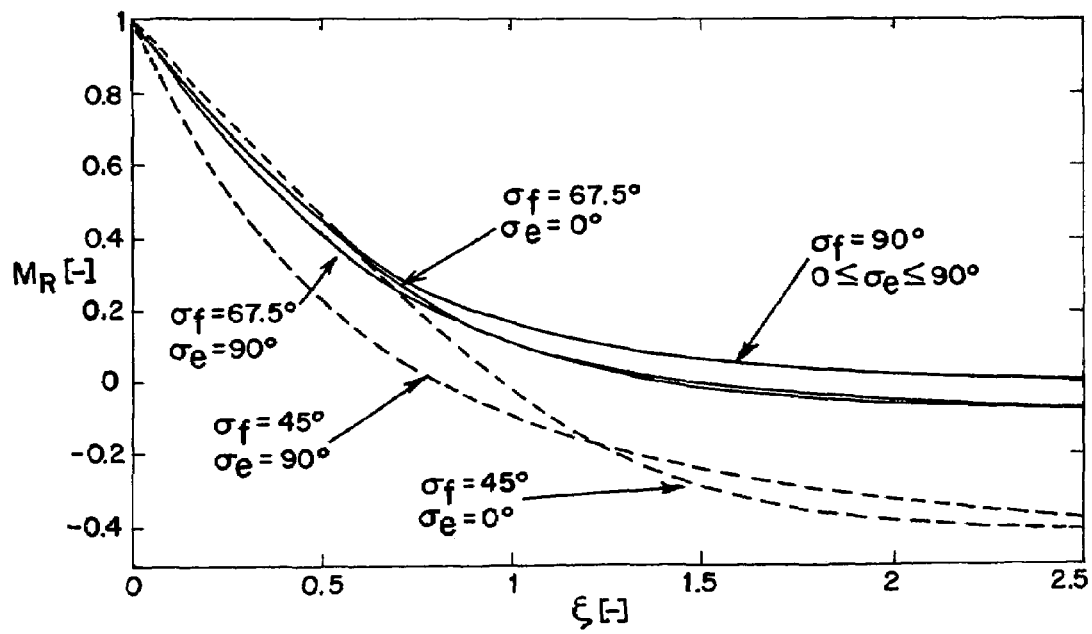
FIG. 6 is a generalized graph of relative tracer mass remaining in the sorbent layer as a function of cumulative fluid flow through the permeable unit $\xi$, inclination $\sigma_f$ and orientation $\sigma_e$ of flow.

FIG. 6 shows a generalized plot of the relative tracer mass $M_R$ retained on the sorbent in a device as a function of $\xi$, the dimensionless cumulative fluid volume delivered through the unit. $\sigma_f$ is hereby used for the angle of intersection between the axis of the device and the flow (e.g. fracture) plane ($\sigma_f=90°$ for perpendicular) and $\sigma_e$ is used for the orientation of flow in the fracture with respect to the orientation of the fracture inclination ($\sigma_e=0°$ for flow aligned with orientation of fracture inclination). This plot was generated using a sorbent layer thickness of 5% of the borehole radius by numerically integrating the analytically described flow fields of FIGS. 2 and 3. Knowing from above that equation (3) is an excellent approximation for this particular relative ring thickness, FIG. 6 shows that equation (3) is also a good approximation for cases where $67.5° \leq \sigma_f \leq 90°$ independent of $\sigma_e$. Thus, if this latter condition is met, equation (3), (4) and (5) can be combined to give the time-averaged specific discharge q for fluid flow through the sorbent layer based on an analysis of the relative tracer mass retained on the insoluble sorbent matrix. For cases where $\sigma_f < 67.5°$ numerically computed graphs as shown in FIG. 6 are generated for a respective $\sigma_f$ and $\sigma_e$ (which can be identified from dye tracer marks on the sorbent layer) in order to determine $\xi$ from $M_R$. q is then obtained as before from equations (4) and (5).

As mentioned above, the flux q obtained represents a fictitious flux for the case where the hydraulic conductivity of the fracture plane or matrix block was the same as of the sorbent layer. Using $k_1$ for the conductivity of the sorbent layer and $k_0$ for the effective conductivity of the fracture plane (assuming laminar flow conditions) or the rock/sediment matrix, the actual flux $q_0$ in the fracture plane or rock matrix is obtained from the relationship $$\frac{q}{q_0} = \frac{2}{\left(1+\frac{k_0}{k_1}\right) - \left(\frac{r_2}{r_1}\right)^2 \cdot \left(1-\frac{k_0}{k_1}\right)} \tag{6}$$

which reduces to $$\frac{q}{q_0} = \frac{k_1}{k_0} \tag{7}$$

for relatively thin sorbent layers ($r_1 \leq 1.1 r_2$, where $r_2$ is the inside radius of the sorbent layer).

The determination of the direction of fluid flow is estimated by visually inspecting dye tracer marks, which are known to evolve first and strongest at the lateral extremes of the device with respect to the fluid flow direction (see FIGS. 2b and 3b). Visual inspection of dye tracer marks on the sorbent layer before tracer extraction and quantitative laboratory analysis also allows for determining fracture (or other types of preferential flow path) locations, separations (frequencies), inclinations, orientations of inclination and apertures. Tracer marks indicating fracture flow will be much stronger than those indicating matrix flows due to the much greater fluxes in fractures.

Applications of the invention to unsaturated flow system are particularly pertinent where the objective is to estimate infiltration or to estimate apparent vertical contaminant (i.e., nutrient, pesticides and metals) transport velocities and fluxes. Of particular interest in this regard is the possibility to install the device in curved boreholes, e.g., underlying a potential contaminant source. The purpose of using the device would be to characterize variations of vertical infiltration and solute fluxes over a horizontal subsurface compliance plane. To characterize infiltration or contaminant fluxes over a large area, multiple devices would be installed over a horizontal plane located at one or more depths beneath the ground surface.

As previously discussed, the present invention offers numerous benefits and advantages including (1) the simultaneous measurement of both fluid and solute cumulative fluxes in observation wells containing both single and multiple screened intervals as well as in unscreened boreholes; (2) the simultaneous long-term measurement of both fluid and solute cumulative fluxes (3) the rapid and efficient testing of water supplies using a minimal amount of energy, equipment, and process steps, with the elimination of complex procedures involving submersible pumps, (4) the ability to test a wide variety of water samples in-situ for many different contaminants; (5) elimination of the need to physically withdraw multiple water samples at the test site which eliminates waste accumulation and disposal problems; (6) a high degree of portability which enables testing to occur at remote location without transporting large amounts of equipment; (7) a reduction in equipment, material, and personnel costs compared with traditional procedures; (8) the ability to test a water supply at multiple locations in the supply which facilitates the production of a vertical and/or horizontal contaminant profile so that site-specific remediation can be achieved; (9) a high degree of flexibility which allows applying the device in horizontal, vertical, inclined, curved boreholes of more or less uniform caliper; and (10) the possibility to monitor water and solute fluxes in different fracture planes and through the rock matrix simultaneously without allowing for disturbances due to cross connections between different fracture planes or well screen intervals.

For these reasons, the claimed invention represents a significant advance in the art of pollution detection and control in matrix and fracture fluid flow systems. Having herein set forth preferred embodiments of the invention, it is anticipated that suitable modifications may be made thereto by individuals skilled in the art, which nonetheless remain within the scope of the invention. For example, the invention shall not be limited to any size or shape parameters, analytical equipment, hardware, and other similar items. In this regard, the present invention shall only be construed in accordance with the following claims:

We claim:

1. A method of estimating simultaneously the magnitude and direction of cumulative and time-average fluid flux and dissolved solute mass flux in both monitoring wells containing single and multiple screened intervals as well as in unscreened boreholes, where in the latter case parameters such as fracture locations, separations, inclinations, orientations of inclination and apertures can be estimated, comprising, in combination, the steps of,
    a) providing at least one sampling device comprising at least one sorbent layer attached to a continuous or segmented impermeable flexible liner ("IFL"), wherein each sorbent layer contains at least one insoluble sorbent matrix and at least one resident tracer with a known mass sorbed on the sorbent;
    b) locating a flow system having fluid flux containing contaminants;
    c) introducing the sampling device into the flow system;
    d) allowing the fluid flux to contact the sorbent layer;
    e) recording the time that the sorbent layer is in contact with the fluid flux;
    f) removing the sampling device from the flow system;
    g) removing the sorbent layer from the IFL for visual and laboratory analysis; and
    h) analyzing the sorbent layer to quantify the cumulative fluid flux from the mass of resident tracer remaining on the sorbent layer, to identify contaminants and to determine contaminant concentrations and fluxes, as well as fracture parameters from visual inspection of the resident tracer marks.

2. A system for estimating simultaneously the magnitude and direction of fluid flux and dissolved solute mass flux in both simply and multiply screened monitoring wells as well as unscreened boreholes, where in the latter case parameters such as fracture locations, separations, inclinations, orientations of inclination and apertures can be estimated, comprising, in combination, the steps of,
    a) at least one monitoring location in a flow system and located in the path of a fluid containing contaminants;
    b) at least one sampling device comprising at least one sorbent layer attached to an impermeable continuous or segmented flexible liner ("IFL"), wherein each sorbent layer contains at least one insoluble sorbent matrix and at least one resident tracer with a known mass sorbed on the sorbent and removeably positioned in the monitoring location in contact with the fluid flux, such that the contaminants are allowed to contact the matrix for a defined time period; and
    c) an analytical procedure comprising methods and instruments to analyze the sorbent layer after removal of the sampling device from the monitoring location and contact with the fluid contaminants, and after removal from the IFL, to measure and quantify cumulative fluid flux, identify contaminants and determine contaminant concentrations and cumulative fluxes as well as fracture parameters.

3. The system of claim 2 wherein at least one resident tracer is a dye.

4. The system of claim 2 wherein at least one monitoring locator is one or more boreholes or monitoring wells.

5. The system of claim 2 wherein the sorbent layer is removably attached to the IFL.

6. A sampling device for estimating simultaneously the magnitude and direction of fluid flux and dissolved solute mass flux within a flow system comprising,
    a sorbent layer attached to an impermeable continuous or segmented flexible liner ("IFL") containing at least one insoluble matrix in the layer preloaded with at least one resident tracer, wherein the matrix has the capacity to selectively adsorb, absorb or otherwise retain contaminants presented in the flowing fluid of a flow system.

7. The device of claim 6 wherein at least one resident tracer is a dye.

8. The device of claim 6 wherein the sorbent layer is removably attached to the IFL.

* * * * *